US011860261B2

(12) United States Patent
Bakka et al.

(10) Patent No.: US 11,860,261 B2
(45) Date of Patent: *Jan. 2, 2024

(54) MASTER-LESS DEVICE COORDINATION IN LOCATION POSITIONING SYSTEM

(71) Applicant: Sonitor Technologies AS, Oslo (NO)

(72) Inventors: Endre Bakka, Oslo (NO); Wilfred Edwin Booij, Oslo (NO)

(73) Assignee: Sonitor Technologies AS, Oslo (NO)

( * ) Notice: Subject to any disclaimer, the term of this patent is extended or adjusted under 35 U.S.C. 154(b) by 0 days.

This patent is subject to a terminal disclaimer.

(21) Appl. No.: 17/903,094

(22) Filed: Sep. 6, 2022

(65) Prior Publication Data

US 2023/0145785 A1 May 11, 2023

Related U.S. Application Data

(63) Continuation of application No. 16/892,049, filed on Jun. 3, 2020, now Pat. No. 11,435,463.

(51) Int. Cl.
*G01S 11/16* (2006.01)
*G01S 11/08* (2006.01)
*H04W 56/00* (2009.01)

(52) U.S. Cl.
CPC .............. *G01S 11/16* (2013.01); *G01S 11/08* (2013.01); *H04W 56/002* (2013.01)

(58) Field of Classification Search
CPC ...... G01S 11/16; G01S 11/08; H04W 56/002; H04W 56/0015

(Continued)

(56) References Cited

U.S. PATENT DOCUMENTS 8,036,330 B2 * 10/2011 Nelson .............. H04W 56/0035
455/39
8,306,014 B1 * 11/2012 Vandwalle ............ H04J 3/0664
370/350

(Continued)

FOREIGN PATENT DOCUMENTS

EP  2 375 834 A2  10/2011
EP  2375834 A2 * 10/2011  ............ H04J 3/0667

(Continued)

OTHER PUBLICATIONS

International Search Report dated Sep. 30, 2021 for Appl. No. PCT/IB2020/054879, 5 pages.

(Continued)

*Primary Examiner* — Mahendra R Patel
(74) *Attorney, Agent, or Firm* — Sterne, Kessler, Goldstein & Fox P.L.L.C.

(57) ABSTRACT

A communication device including a clock, a memory, and at least one processor is disclosed. The at least one processor is configured to execute instructions stored in the memory that cause the at least one processor to perform operations including receiving at least one message from a second communication device of a plurality of communication devices over a preconfigured time duration, determining a first local time of the clock of the communication device at which the at least one message from the second communication device is received, and determining a sync-time of the second communication device based on the at least one message from the second communication device. The operations include mapping the sync-time of the second communication device based on the first local time and the determined sync-time of the second communication device and adjusting a sync-time of the communication device based on the second local time.

20 Claims, 4 Drawing Sheets

(58) Field of Classification Search
USPC .................................................. 455/456.1
See application file for complete search history.

(56) References Cited

U.S. PATENT DOCUMENTS

| | | | |
|---|---|---|---|
| 10,009,862 B1* | 6/2018 | Malovany | H04W 4/80 |
| 10,348,429 B2* | 7/2019 | Galea | H04W 56/001 |
| 10,462,759 B2* | 10/2019 | Kerai | H04W 4/80 |
| 10,470,143 B2* | 11/2019 | Corley | H04W 56/001 |
| 11,435,463 B2 | 9/2022 | Bakka et al. | |
| 11,558,832 B2* | 1/2023 | Wu | H04W 56/00 |
| 2008/0152046 A1* | 6/2008 | Armstrong | H04J 3/0658 |
| | | | 375/354 |
| 2011/0221633 A1 | 9/2011 | Schramm et al. | |
| 2011/0249688 A1* | 10/2011 | Liu | H04J 3/0682 |
| | | | 370/503 |
| 2011/0299521 A1* | 12/2011 | Shao | H04J 3/0697 |
| | | | 370/350 |
| 2014/0095887 A1 | 4/2014 | Nayshtut et al. | |
| 2014/0112243 A1* | 4/2014 | Suzuki | H04W 76/28 |
| | | | 370/328 |
| 2014/0269645 A1* | 9/2014 | Do | H04W 56/0065 |
| | | | 370/338 |
| 2014/0351650 A1 | 11/2014 | Eliás et al. | |
| 2015/0092642 A1* | 4/2015 | Geboff | H04L 69/329 |
| | | | 370/350 |
| 2015/0103818 A1* | 4/2015 | Kuhn | H04W 56/00 |
| | | | 370/350 |
| 2016/0044648 A1* | 2/2016 | Gao | H04W 16/14 |
| | | | 370/336 |
| 2017/0034800 A1* | 2/2017 | Abedini | H04W 56/0015 |
| 2018/0356520 A1* | 12/2018 | Booij | G01S 5/02585 |
| 2019/0253169 A1* | 8/2019 | Ha | H04W 56/002 |
| 2019/0394017 A1* | 12/2019 | Seo | H04L 69/28 |

FOREIGN PATENT DOCUMENTS

| | | | | |
|---|---|---|---|---|
| EP | 2487819 A1 * | 8/2012 | | H04J 3/0697 |
| WO | WO 2006/057848 A2 | 6/2006 | | |
| WO | WO-2006057848 A2 * | 6/2006 | | H04N 21/4305 |
| WO | WO-2017007285 A1 * | 1/2017 | | H04L 5/0048 |
| WO | WO 2017/084607 A1 | 5/2017 | | |
| WO | WO-2017084607 A1 * | 5/2017 | | H04L 27/26 |
| WO | WO 2019/145922 A1 | 8/2019 | | |
| WO | WO-2019145922 A1 * | 8/2019 | | G01P 13/00 |
| WO | WO-2019163443 A1 * | 8/2019 | | G05B 19/0423 |
| WO | WO-2020143571 A1 * | 7/2020 | | H04W 56/001 |

OTHER PUBLICATIONS

Written Opinion dated Sep. 30, 2021 for Appl. No. PCT/IB2020/054879, 8 pages.

* cited by examiner

MASTER-LESS DEVICE COORDINATION IN LOCATION POSITIONING SYSTEM

CROSS-REFERENCE TO RELATED APPLICATIONS

This application is a continuation of U.S. patent application Ser. No. 16/892,049, filed on Jun. 3, 2020, which is hereby incorporated by reference in its entirety.

FIELD

The present disclosure is generally related to the synchronization of communication devices in a wireless communication system.

BACKGROUND

In a communication system, each communication device has an internal clock. The internal clock of the communication device needs to be synchronized with reference to an external clock, such as a global positioning system (GPS) clock or a coordinated universal time (UTC) clock. Synchronizing each communication device in the communication system requires a network time protocol (NTP) server. In addition to the NTP server, several gateway servers may also be required. The NTP server and gateway servers required for synchronizing internal clocks of the communication devices increase the complexity of the communication system and the total cost of the communication system.

SUMMARY

In an embodiment of the present disclosure, a communication device is disclosed. The communication device may include a clock, a first transceiver coupled with an antenna, a second transceiver coupled with a transducer, a memory, and at least one processor that is configured to execute instructions stored in the memory. The instructions cause the at least one processor to perform operations including receiving at least one message from a second communication device of a plurality of communication devices over a preconfigured time duration. The at least one message received at the communication device of the plurality of communication devices from the second communication device may include first timing information that indicates a sync-time of the second communication device. The operations may include determining a first local time of the clock of the communication device at which the at least one message from the second communication device is received and determining the sync-time of the second communication device based on the at least one message received from the second communication device. The operations may include mapping the sync-time of the second communication device to a second local time of the clock of the communication device based on the first local time, and the determined sync-time of the second communication device. The operations may include adjusting a sync-time of the communication device based on the second local time. In embodiments, the sync-time of the communication device may correspond with a first configurable offset within which a first data may be transmitted from the communication device to the plurality of communication devices, and the sync-time of the second communication device may correspond with a second configurable offset within which a second data may be transmitted from the second communication device to the plurality of communication devices. The first data may include location information of the communication device, and the second data may include location information of the second communication device. The communication device and the second communication device may be base stations. In embodiments, the first transceiver is a radio frequency transceiver, and the second transceiver is an acoustic transceiver or an infrared transceiver.

In another embodiment of the present disclosure, a method is disclosed. The method steps may be performed by a first communication device of a plurality of communication devices. The method may include receiving, at the first communication device, at least one message from a second communication device of the plurality of communication devices over a preconfigured time duration. The at least one message from the second communication device may include first timing information that indicates a sync-time of the second communication device. The method may include determining a first local time of a clock of the first communication device at which the at least one message from the second communication device is received and determining the sync-time of the second communication device based on the at least one message received from the second communication device. The method may include mapping the sync-time of the second communication device to a second local time of the clock of the first communication device based on the first local time, and the determined sync-time of the second communication device. The method may include adjusting a sync-time of the first communication device based on the second local time. In embodiments, the sync-time of the first communication device may correspond with a first configurable offset within which a first data may be transmitted from the first communication device to the plurality of communication devices, and the sync-time of the second communication device may correspond with a second configurable offset within which a second data may be transmitted from the second communication device to the plurality of communication devices. The first data may include location information of the first communication device, and the second data may include location information of the second communication device. The first communication device and the second communication device may be base stations.

In yet another embodiment of the present disclosure, a computer-readable media (CRM) including computer instructions, is disclosed. The computer instructions may be executed by one or more processors of a communication device of a plurality of communication devices, and cause the one or more processors to receive at least one message from a second communication device of the plurality communication devices over a preconfigured time duration. The at least one message from the second communication device may include first timing information that indicates a sync-time of the second communication device. The computer instructions may cause the one or more processors to determine a first local time of a clock of communication device at which the at least one message from the second communication device is received and the sync-time of the second communication device based on the at least one message received from the second communication device. The computer instructions may cause the one or more processors to map the sync-time of the second communication device to a second local time of the clock of the communication device based on the first local time, and the determined sync-time of the second communication device. The computer instructions may cause the one or more processors to adjust a sync-time of the communication device based on the second local time. In embodiments, the sync-time of the communication device may correspond with a first configurable offset within which a first data may be transmitted from the communication device to the plurality of communication devices, and the sync-time of the second communication device may correspond with a second configurable offset within which a second data may be transmitted from the second communication device to the plurality of communication devices. The first data may include location information of the communication device, and the second data may include location information of the second communication device. The communication device and the second communication device may be base stations.

BRIEF DESCRIPTION OF THE DRAWINGS

The accompanying drawings, which are incorporated herein and form a part of the specification, illustrate embodiments of the present disclosure and, together with the description, further explain the principles of the disclosure and enable a person skilled in the pertinent arts to make and use the embodiments.

DETAILED DESCRIPTION

Figure 1:
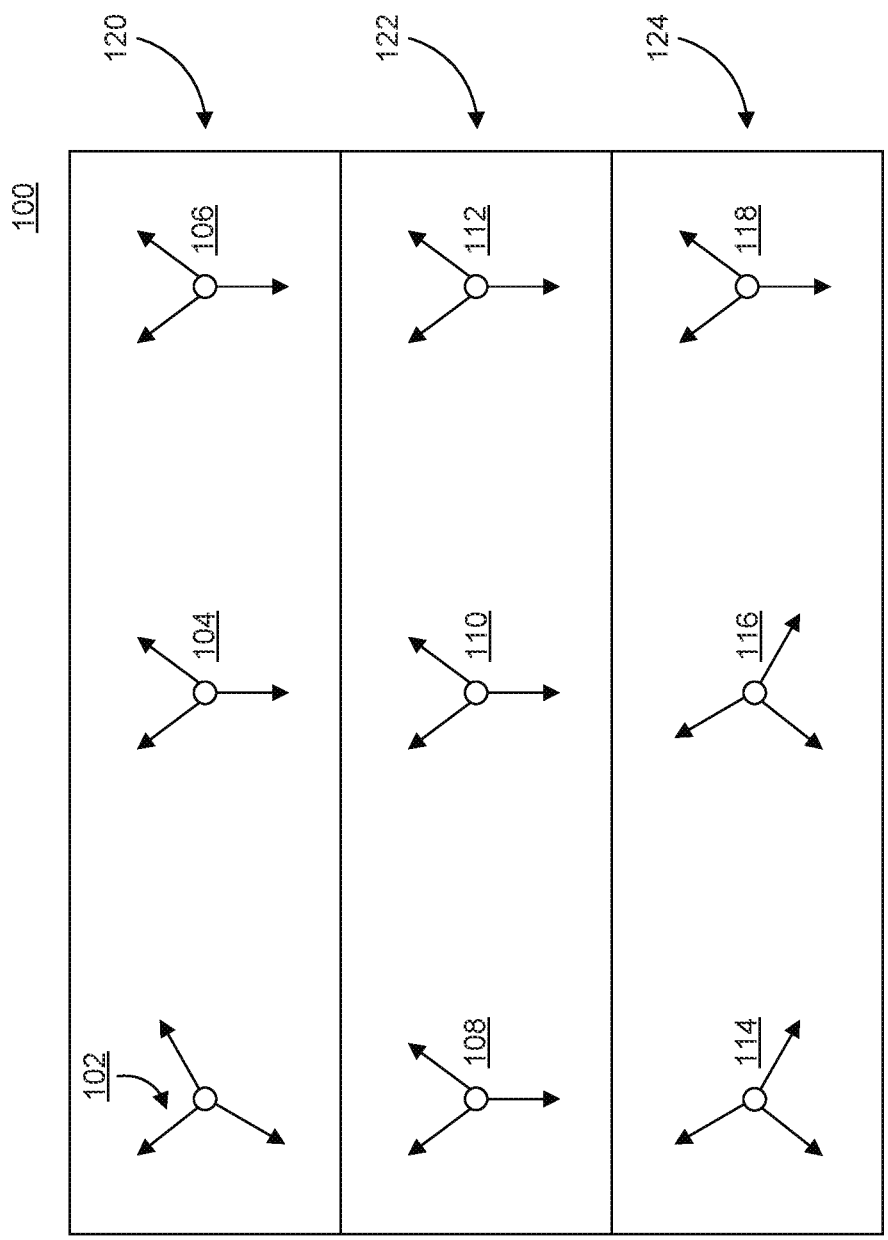
FIG. 1 depicts an example environment in accordance with some embodiments.

The present disclosure will be described with reference to the accompanying drawings.

The following Detailed Description refers to accompanying drawings to illustrate exemplary embodiments consistent with the disclosure. References in the Detailed Description to "one exemplary embodiment," "an exemplary embodiment," "an example embodiment," etc., indicate that the exemplary embodiment described may include a particular feature, structure, or characteristic, but every exemplary embodiment does not necessarily include the particular feature, structure, or characteristic. Moreover, such phrases do not necessarily refer to the same exemplary embodiment. Further, when the disclosure describes a particular feature, structure, or characteristic in connection with an exemplary embodiment, those skilled in the relevant arts will know how to affect such feature, structure, or characteristic in connection with other exemplary embodiments, whether or not explicitly described.

The exemplary embodiments described herein provide illustrative examples and are not limiting. Other exemplary embodiments are possible, and modifications may be made to the exemplary embodiments within the spirit and scope of the disclosure. Therefore, the Detailed Description does not limit the disclosure. Rather, only the below claims and their equivalents define the scope of the disclosure.

Hardware (e.g., circuits), firmware, software, or any combination thereof may be used to achieve the embodiments. Embodiments may also be implemented as instructions stored on a machine-readable medium and read and executed by one or more processors. A machine-readable medium includes any mechanism for storing or transmitting information in a form readable by a machine (e.g., a computing device). For example, in some embodiments, a machine-readable medium includes read-only memory (ROM); random-access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that the actions result from computing devices, processors, controllers, or other devices executing the firmware, software, routines, and/or instructions.

Any reference to the term "module" shall be understood to include at least one of software, firmware, and hardware (such as one or more circuit, microchip, or device, or any combination thereof), and any combination thereof. Besides, those skilled in relevant arts will understand that each module may include one or more than one component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will fully reveal the general nature of the disclosure so that others can, by applying knowledge of those skilled in relevant arts, readily modify and/or customize for various applications such exemplary embodiments, without undue experimentation and without departing from the spirit and scope of the disclosure. Therefore, such modifications fall within the meaning and plurality of equivalents of the exemplary embodiments based upon the teaching and guidance presented herein. Here, the phraseology or terminology serves the purpose of description, not limitation, such that the terminology or phraseology of the present specification should be interpreted by those skilled in relevant arts in light of the teachings herein.

FIG. 1 depicts an example environment in accordance with some embodiments. The example environment of FIG. 1 corresponds with an indoor positioning system or a real-time location system for indoor tracking. As shown in FIG. 1, three floors 120, 122, and 124 inside a building 100 is shown. On each floor, one or more communication devices are installed. By way of a non-limiting example, three communication devices 102, 104, and 106 are installed on the floor 120 such that the communication device 104 and/or the communication device 106 may receive a signal transmitted by the communication device 102. Similarly, the communication device 102 and/or the communication device 104 may receive a signal transmitted by the communication device 106, and the communication device 102 and/or the communication device 106 may receive a signal transmitted by the communication device 104. As shown in FIG. 1, three communication devices 108, 110, and 112 are installed on the floor 122, and three communication devices 114, 116, and 116 are installed on the floor 124.

In some embodiments, the communication devices 102, 104, 106, 108, 110, 112, 114, 116, and 118 may be base stations that may transmit their location information in an acoustic signal, an infrared signal, an ultra-wideband signal, and/or a radio frequency signal. One or more portable tags or user equipment (UE) devices such as a smartphone, a mobile phone, a laptop, a tablet, a personal computer, etc., may receive the location information transmitted from any of the communication devices 102, 104, 106, 108, 110, 112, 114, 116, and 118, and transmit data derived from received location information along with tag identifying information to a server via one or more access points. The server may then determine the location of a portable tag using information received from the portable tag via the one or more access points. By way of a non-limiting example, the one or more portable tags or UE devices may determine location of the one or more portable tags or UE devices using signals received from one or more communications devices 102, 104, 106, 108, 110, 112, 114, 116, and 118.

In some embodiments, by way of a non-limiting example, the communication devises 102, 104, 106, 108, 110, 112, 114, 116, and 118 may include a infrared transceiver to transmit and receive a infrared signal.

As described above, the communication devices 102, 104, 106, 108, 110, 112, 114, 116, and 118 may transmit their location information as a broadcast signal at a precise time such that other communication devices including base stations, portable tags, stationary tags, mobile phones, smartphones, laptops, etc., can deduce the precise time at which the communication device, for example, communication device 102, may broadcast a data signal that may include location information of the communication device. The precise time at which the communication device broadcasts the data signal containing its location information may be deduced based on when other units send their BLE or acoustic messages including sync-time, which is a time 0 within a second if the signals are sent every second. Each communication device in the communication system is synchronized for the sync-time of other communication devices in the communication system, as described in detail below, such that each communication device may have the same sync-time when measured against an external clock, e.g., a global positioning system (GPS) clock. However, in the embodiments, as described herein, each communication device of the communication system is synchronized without any additional hardware required for synchronization using the GPS clock.

In some embodiments, each communication device in the communication system has an internal clock that may have a resolution better than 1 ms. In most cases, a real-time crystal is used with a frequency of 32768 Hz in combination with a counter. The internal clock reports clock tick $n_{RTC}$ since startup within the confines of the physical hardware unit to any software service that might require it. Generally, there may be a delay between the registration of the clock count and the association of the registration with another event. In embedded hardware units, such delays are deterministic and can be measured to compensate them. The internal clock may experience a drift with respect to universal time, $a_{RTC}$. With respect to a reference time t (e.g., simulation or universal time), the clock count is typically represented as $n_{RTC}=a_{RTC} \times t+b_{RTC}$, where $b_{RTC}$ represents a constant drift. This linearized approach may be applicable over a finite timespan, typically of the order of minutes or hours, depending on environmental conditions and the hardware used. Further, $n_{RTC}$ is an integer, and, therefore, suffers from rounding issues and wrapping. Accordingly, synchronization of the internal clock may be achieved by messaging the other communication devices for the offset and drift of the internal clock such that the other communication devices may update their offset and drift so that all the communication devices in the communication system may have their internal clocks synchronized.

In some embodiments, by way of a non-limiting example, the communication devices 102, 104, 106, 108, 110, 112, 114, 116, and 118 each may transmit a message using a radio frequency signal, such as a Bluetooth Low Energy (BLE) advertising identifiers (IDs). The communication device may broadcast the BLE advertising IDs at a preconfigured time interval. The preconfigured time interval may be referred to in this disclosure as a sync interval. By way of a non-limiting example, the sync interval maybe 100 milliseconds, 1 second, or 5 seconds, etc.

In some embodiments, the BLE advertising ID may include an identification of the communication device broadcasting the BLE advertising ID and timing information that indicates a sync-time of the communication device broadcasting the BLE advertising ID. By way of a non-limiting example, the BLE advertising ID may be according to the Eddystone format that is an open beacon format developed by Google. The timing information in the BLE advertising ID, for example, maybe a number between 0-32768, which corresponds to a number of ticks of a clock of 32768 Hz frequency since the sync-time of the communication device that is broadcasting the BLE advertising ID. By way of a non-limiting example, the timing information in the BLE advertising ID may be the current time, an offset, or drift with respect to the sync-time of the communication device broadcasting the BLE advertising ID. Accordingly, when other communication devices receive the BLE advertising ID broadcast from the communication device, the other communication devices may calculate the sync-time of the communication device with respect to their internal clocks, and adjusts their sync-times.

In some embodiments, the offset may be expressed as physical real-time clock (RTC) counts or as virtual clock counts. The virtual clock counts may be corrected for the relative drift of the clock of the communication device broadcasting the BLE advertising ID.

By way of a non-limiting example, the communication devices 102, 104, and 106 each are within the communication zone of each other. Accordingly, the sync-time of the communication device 102 may be synchronized with the sync-times of the communication devices 104 and 106, as described herein. Similarly, the sync-time of the communication device 104 may be synchronized with the sync-times of the communication devices 102 and 106, and the sync-time of the communication device 106 may be synchronized with the sync-times of the communication devices 102 and 104. This process of synchronizing the sync-time is described below with reference to the communication devices 102 and 104.

In some embodiments, for example, the communication device 102 may receive a BLE advertising ID broadcast from the communication device 104. The BLE advertising ID from the communication device 104 may include the timing information as described above in addition to the identification of the communication device 104. To determine sync-time of the communication device 104 with respect to an internal clock and internal sync-time of the communication device 102, the communication device 102 may determine a local time of the internal clock at which the communication device 102 received the BLE advertising ID. The communication device 102 may then determine a timestamp of the BLE advertising ID and the sync-time of the communication device 104 included in the BLE advertising ID. Based on the local time of the internal clock at which the communication device 102 received the BLE advertising ID from the communication device 104, the timestamp of the BLE advertising ID from the communication device 104, and the sync-time of the communication device 104 included in the BLE advertising ID, the communication device 102 may calculate how many ticks of the internal clock of the communication device 102 ago, the sync-time of the communication device 104 may have occurred. The communication device 102 may then adjust its own sync-time based on the mapped sync-time of the communication device 104 with respect to its own internal clock. By way of a non-limiting example, the communication device 102 may adjust its own sync-time to occur concurrently with the communication device 104. In some cases, the communication device 102 may adjust its sync-time to occur at a preconfigured number of ticks apart from the sync-time of the communication device 104.

In some embodiments, the communication device 102 may listen for the BLE advertising ID from other communication devices, for example, the communication device 104, before the communication device 102 may broadcast a BLE advertising ID. The communication device 102 may wait for a predetermined time interval, for example, up to 10 seconds, before broadcasting the BLE advertising ID including a sync-time of the communication device 102 and a device identifier of the communication device 102. If the communication device 102 does not receive a BLE advertising ID within the predetermined time interval, the communication device may broadcast the BLE advertising ID. In some cases, the communication device 102 may broadcast the BLE advertising ID after the communication device 102 may adjust its sync-time with reference to one or more communication devices, for example, the communication device 104, etc.

The standard BLE advertising ID packet generally has very little room for extra data to be transmitted. Besides, sending more data on the air requires additional battery power of the communication device sending data. Accordingly, to save the battery power of the communication device, the communication device may be configured to send the BLE advertising ID at the sync-time of the communication device. Accordingly, the timing information in the BLE advertising ID may not include the current time, the offset, the drift, and/or the number of ticks of the clock of 32768 Hz frequency since the sync-time of the communication device that is broadcasting the BLE advertising ID. Rather, the communication device may broadcast the BLE advertising ID at the sync-time of the communication device, and the communication devices thus receiving the BLE advertising ID may deduce the sync-time based on the timestamp at which the BLE advertising ID was broadcasted. By way of a non-limiting example, the communication device may send subsequent BLE advertising IDs at a sync-time plus configurable interval. The configurable interval may increase for each subsequent broadcast of the BLE advertising ID. For example, the configurable interval for one BLE advertising ID may be 10 ms, the configurable interval for the next BLE advertising ID may be 20 ms, and the configurable interval for the next BLE advertising ID may be 30 ms, and so, until the configurable interval reaches a value of 50 ms. Once the configurable interval reaches the value of 50 ms, the next BLE advertising ID may be sent with the configurable interval of 0, and then again follows as described above. Accordingly, the communication device may save battery power and may avoid packet collisions with other communication devices.

In some embodiments, the communication device may determine the total number of neighbor communication devices. The communication device may then determine a time window to send the BLE advertising ID based on the total number of neighbor communication devices. For example, the communication device may select the time window to send the BLE advertising ID as 10 ms if the total number of neighbor communication devices are four but may select the time window to send the BLE advertising ID as 100 ms if the total number of neighbor communication devices are 100. Within the selected time window, the communication device may transmit the BLE advertising ID comprising the sync offset.

Since a clock of the communication device continuously drifts away, the communication device 102 may listen again for the BLE advertising IDs from the other communication devices, for example, the communication device 104 and/or the communication device 106, to adjust sync-time of the communication device 102. Thus, the communication device may adjust the sync-time of the communication device 102 with reference to the sync-time of the communication device 104 and the sync-time of the communication device 106. Accordingly, within few seconds or minutes, for example, within 10 seconds or so, a consensus is reached between the communication devices 102, 104, and 106 regarding their sync-times such that the sync-times of the communication devices 102, 104, and 106 would be same when measured against an external clock, such as the GPS clock. However, the GPS clock is not used for synchronization of the sync-times of the communication devices 102, 104, and 106.

In some embodiments, after an initial adjustment or synchronization of the sync-time of the communication device is achieved with reference to other communication devices in the network, the communication device may wait for a longer duration before waking up to listen for the BLE advertising IDs from the other communication devices. The duration before which the communication device may wake up to listen again for the BLE advertising IDs may vary based on the confidence of the communication device in its clock drift and adjustment.

In some embodiments, the communication device may be configured to synchronize its sync-time with reference to some communication devices only. For example, the communication devices 102, 104, and 106 each may be within communication range of one other. The communication device 102 may also receive signals from the communication device 108, but the communication device 102 may be configured not to synchronize its sync-time with the communication device 108.

In some embodiments, if the communication device determines that the sync-time of a particular communication device drifts outside of an allowed clock drift range, the communication device may put the specific communication device in a blacklist and may not synchronize its sync-time with the specific communication device in the blacklist.

The process or algorithm of synchronizing the sync-time of the communication device 102 with reference to the sync-time of the communication device 104 is simple. However, in the communication system, there are many communication devices. Accordingly, various algorithms may be used to synchronize the sync-times of communication devices.

Figure 2:
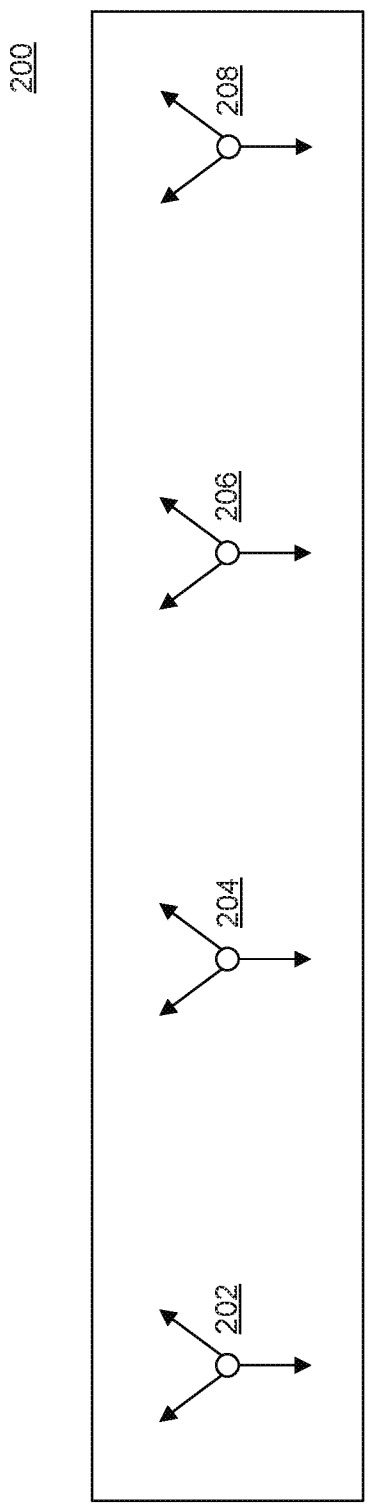
FIG. 2 depicts another example environment in accordance with some embodiments.

Various algorithms that may be used for synchronizing the sync-times of the communication devices are described with reference to an example environment, as shown FIG. 2. In FIG. 2, a floor or a hallway 200 with communication devices 202, 204, 206, and 208 are shown that are similar to the communication devices shown in FIG. 1. The communication device 202 may be in a communication range of the communication device 204. The communication device 204 may be in a communication range of the communication devices 202 and 206. The communication device 206 may be in a communication range of the communication devices 204 and 208, and the communication device 208 may be in a communication range of the communication device 206.

In some embodiments, the communication device 204, which is in the communication range of the communication device 202 and the communication device 206 each, the communication device 204 may receive the BLE advertising ID from the communication device 202 and the communication device 206. The communication device 204 then adjusts its sync-time based on an average of an offset and drift of the communication device 202 and the communication device 206. Accordingly, a virtual clock of the communication device 202 is based on an average offset and drift of all communication devices in the communication system; this algorithm may be referenced as an average algorithm. Even though, the communication device 204 is not within the communication range of the communication device 208, because the sync-time of the communication device 206 is affected based on the offset and drift of the communication devices 208 and 204, in the average algorithm, the virtual clock of the communication device 204 is directly or indirectly affected from the offset and drift of all communication devices. Accordingly, the sync-time of each communication device of the communication system will converge towards the same virtual clock.

In some embodiments, the sync-time may be adjusted using an algorithm similar to the average algorithm. However, the sync-times of the communication devices that are farther away are given more weightage compared to the sync-times of the communication devices that are closer to the sync-time of the communication device being adjusted. In comparison with the average algorithm, in the weighted average algorithm, the sync-time of each communication device of the communication system will converge towards the same virtual clock faster.

In some embodiments, for example, if the sync-time of the communication device 202 is less than 500 ms after the sync-time of the communication device 204 and the sync-time of the communication device 206 is between 500 to 1000 ms after the sync-time of the communication device 202, then the communication device 202 may be considered slowest unit when a sync-time interval is 1 second (1000 ms). The communication device 204 may then adjust its sync-time based on the sync-time of the communication device 202 rather than the communication device 206. In some cases, the communication device 204 may adjust its sync-time based on the sync-time of the communication device 206, which is the fastest unit as explained above, rather than the communication device 202. As described above, the communication device 204 may repeat adjustment of its sync-time at a preconfigured time interval, which may be up to 60 seconds. This algorithm may be referred to in this disclosure as the slowest clock algorithm since the communication device adjusts its sync-time with reference to the slowest clock.

In some embodiments, the communication device may randomly select the sync-time of another communication device to adjust its sync-time. By way of a non-limiting example, assuming the communication devices 202, 204, 206, and 208 are each within a communication range of each other, then the communication device 204 may randomly choose the sync-time of the communication device 202 to adjust its sync-time. Since both the communication devices 202 and 204 now broadcast the same sync-time, the communication devices 206 may also select the sync-time broadcasted by the communication device 202 or 204 to adjust its sync-time. The communication device 208 may also then adjust its sync-time based on the sync-time of communication device 202, 204, or 206. Accordingly, all communication devices may end up having the same sync-time. By way of a non-limiting example, the communication device may select a different communication device to adjust its sync-time each time the communication device listens to other communication devices at a predetermined time interval. This algorithm may be referenced in this disclosure as a random algorithm. The random algorithm is based on the assumption that in a communication system of many communication devices broadcasting the same sync-time offset, there is a high probability that other communication devices in the communication system may use the same sync-time offset to adjust their sync-time. In some embodiments, various algorithms described in this disclosure may all be run by the communication device when the communication device listens for other devices to adjust its sync-time.

In some embodiments, the communication device may use a Kalman filter to estimate offset and drift based on the sync-time offset and drift information of the other communication devices received over time. The communication device may then adjust its sync-time based on the estimated offset and drift values. In some embodiments, the communication device may use artificial intelligence, including a neural network, to train a machine-learning algorithm to reduce the sync-time difference between various communication devices in the communication system. By way of a non-limiting example, the neural network may be a long short-term memory (LSTM) that may be used for classifying, processing, and predicting based on historical data.

In some embodiments, the communication device may apply more than one algorithms to adjust the sync-time. The algorithms, for example, the average algorithm, the weighted average algorithm, the slowest clock algorithm, the random algorithm, the Kalman filter, the machine-learning algorithm, and/or other algorithms may be applied in any order and any combination thereof.

In some embodiments, the communication device may not broadcast its sync-time offset and drift at all, but instead, update its sync-time based on the sync-time offset of the other communication devices. Accordingly, the communication device may save its battery power.

In some embodiments, the communication device may broadcast its sync-time offset based on the status of the remaining battery power. The communication device may adapt the broadcasting of its sync-time according to the remaining battery power. In other words, the communication device may broadcast its sync-time at an increasing time interval based on the remaining battery power.

In some embodiments, the communication device may not wake up for a longer period to listen for the sync-time update from the other communication devices after the communication device determines that its sync-time has reached a sufficient accuracy. The communication device may use the standard deviation of sync-time information received from the neighbor communication devices to determine its sync-time has reached a sufficient accuracy. The communication device may also choose to listen for a shorter period of time or to listen for fewer messages, for example, only one message, compared to when the communication device first powered-on. The communication device may then listen for a longer period of time or for more messages when the communication device determines its sync-time offset compared to sync-times of other communication devices is outside a range of permissible configurable threshold, for example, 50 to 100 microseconds.

In some embodiments, the communication device may determine a time window for listening messages from neighbor communication devices based on a number of messages received from each of the neighbor communication devices and/or standard deviation or standard error of the received sync-time information from the neighbor communication devices.

In some embodiments, if the standard deviation or standard error of the received sync-time information from a particular neighbor communication device is below a predetermined threshold value, e.g., a couple of clock ticks such as 10 clock ticks, the communication device may start estimation of the drift parameter and may increase the time interval between listening instances.

In some embodiments, the standard error or standard deviation of sync-time information from the neighbor communication devices may be grouped based on various ranges of the standard error or standard deviation. Accordingly, outlier neighbor communication devices may be identified, and sensitivity to such outlier neighbor communication devices may be controlled.

In some embodiments, the communication device may broadcast its sync-time within a time window of, for example, 200 ms. Then, during listening, if the communication device receives messages from a very few other communication devices, for example, less than five communication devices, the communication device may reduce its time window to, for example, 10 ms. The communication device then monitors if the other communication devices also reduce their transmit time windows. If the communication device determined that the other communication devices have reduced their transmit time windows, the communication device then reduces its listening period. However, during listening, if the communication device receives messages from more communication devices, for example, five or more communication devices, then the communication device may reduce its transmit and receive time windows, for example, to 30 ms. When the communication device detects one or more new communication devices during listening, the communication device may increase its transmit and receive time windows by 1 second. In other words, the communication device may adjust its transmit and receive time windows dynamically based on the number of other neighbor communication devices from which the communication device receives sync-time information.

Figure 3:
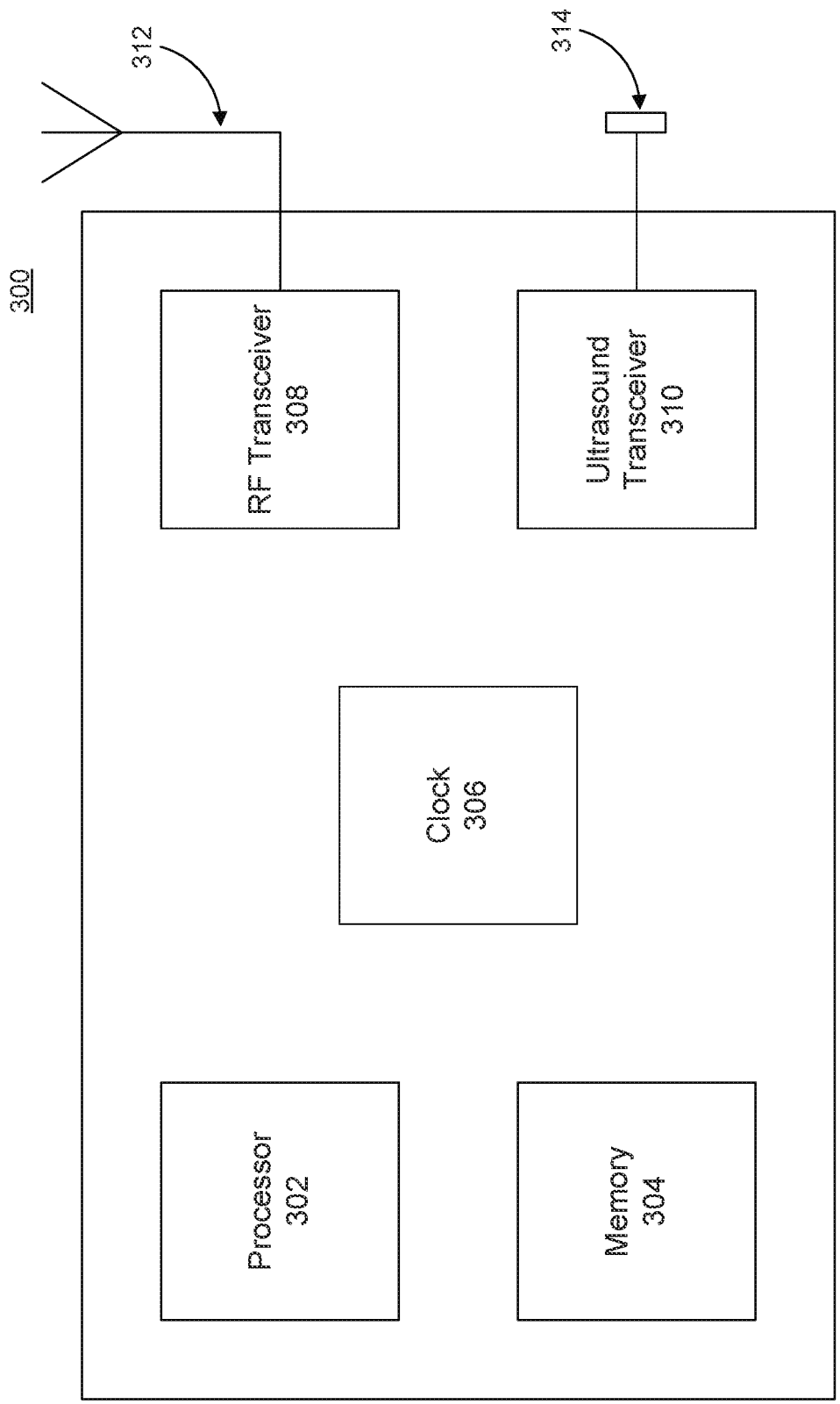
FIG. 3 depicts an example block diagram of a communication device in accordance with some embodiments.

FIG. 3 depicts an example block diagram of a communication device in accordance with some embodiments. A communication device 300 may include a processor 302, a memory 304, a clock 306, a radio frequency (RF) transceiver 308 coupled with an antenna 312, and an acoustic transceiver 310 coupled with an acoustic transducer 314. Even though only one processor is shown in FIG. 3, the communication device may include more than one processor. The processor 302 may be communicatively coupled with the memory 304. The memory 304 may be a random access memory (RAM), a hard-disk, etc. The memory 304 may store instructions that may be executed by the processor 302 to perform operations according to various embodiments as described herein. The clock 306 may have a frequency of 32768 Hz. The clock 306 may be battery powered and may have a very low power consumption. A resolution of the clock 306 may be about 30 microseconds (μs). The low resolution of 30 μs of the clock 306 may impact the accuracy of the sync-time of the communication device 300.

In some embodiments, to improve the accuracy of the sync-time of the communication device 300, another high-frequency clock may be used to interpolate between ticks of the clock 306 when listening for messages from other communication devices or transmitting to other communication devices. Since the high-frequency clock normally when the communication device is listening for messages from other communication devices or transmitting to other communication devices, there may not be an adverse impact on the battery life of the communication device.

The RF transceiver 308 coupled with the antenna 312 may be a radio frequency transceiver according to any of the Wi-Fi protocols, for example, the Institute of Electrical and Electronics Engineers (IEEE) 802.11a/b/g/n/ac/ax. The RF transceiver 308 may be according to IEEE 802.15.4, Bluetooth Low Energy (BLE), ZigBee, 3G, 4G, 5G, 6G, etc. The RF transceiver 308 may be according to any radio frequency standard/protocol for a low-rate wireless transmission. The acoustic transceiver 310, coupled with the acoustic transducer 314, may transmit data signals containing location information of the communication device 300.

Figure 4:
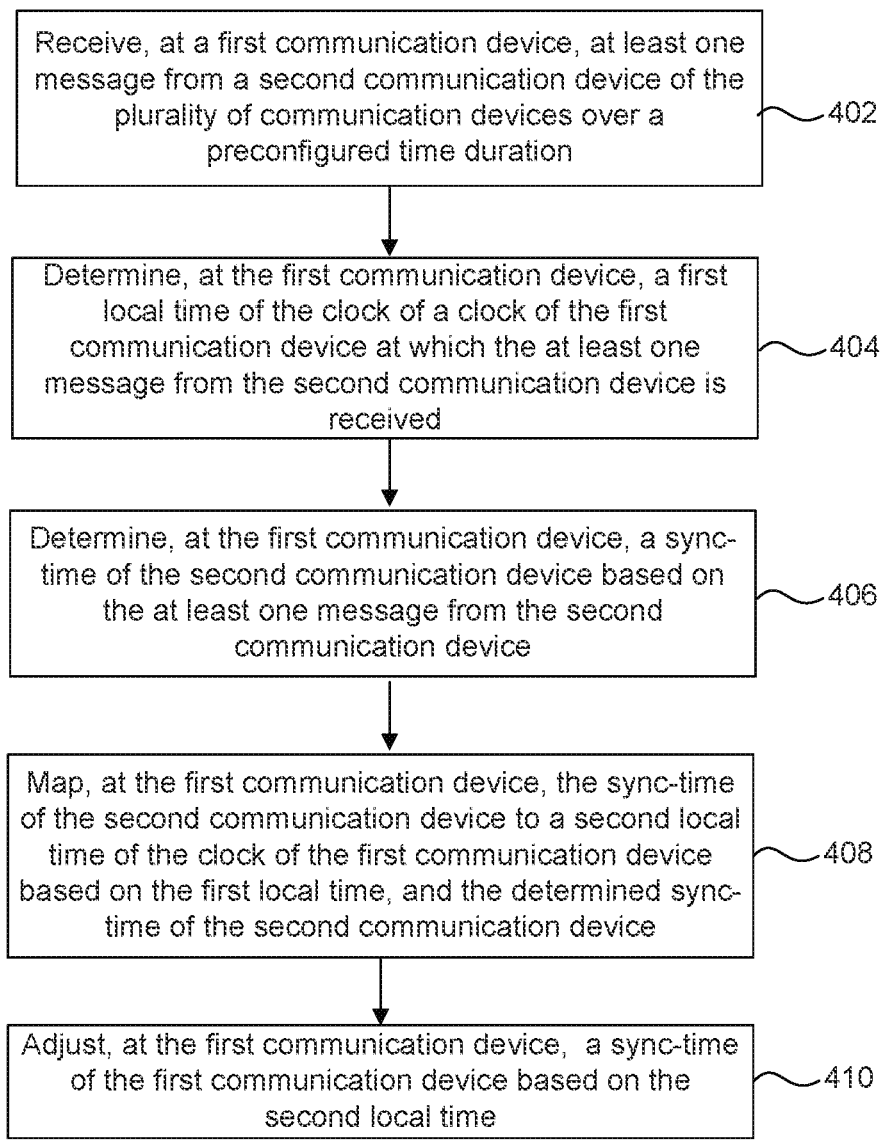
FIG. 4 depicts an example flow-chart of method steps in accordance with some embodiments.

FIG. 4 depicts an example flow-chart of method steps in accordance with some embodiments. The method steps described in a flow-chart 400 may be performed by the first communication device of a plurality of communication devices. At step 402 of the flow-chart 400, the first communication device may receive at least one message from a second communication device of the plurality of communication devices over a preconfigured time duration. The at least one message from the second communication device may include first timing information that indicates a sync-time of the second communication device. The at least one message from the second communication may also include an identifier of the second communication device. As described above, the at least one communication message may be received via the antenna 312 and the RF transceiver 308.

In accordance with some embodiments, the first timing information may include at least one of a number of ticks since the sync-time of the second communication device, a time of transmission of the at least one message from the second communication device, and an offset since the sync-time of the second communication device. As described above, the second communication device may be configured to transmit the at least one message at its sync-time. Accordingly, the sync-time of the second communication device may be deduced by the communication device based on the transmission timestamp of the at least one message from the second communication device.

In accordance with some embodiments, the at least one message may be received over the preconfigured time duration that may be at least 60 seconds. By way of a non-limiting example, the preconfigured time duration may be set to 3 seconds to receive one to three messages.

In accordance with some embodiments, the at least one message may be compressed, and an average interval between the messages may be about 2-20 ms.

In accordance with some embodiments, at step 404, the first communication device may determine a first local time of a clock of the first communication device at which the at least one message from the second communication device is received.

In accordance with some embodiments, at step 406, the first communication device may determine the sync-time of the second communication device based on the first timing information. As described above, by way of a non-limiting example, the first timing information may be a timestamp at which the second communication device transmitted the at least one message. The second communication device may be configured to transmit the at least one message at the sync-time of the second communication device. Accordingly, based on the timestamp of the at least one message, the sync-time of the second communication device may be determined.

By way of a non-limiting example, the second communication device may include the offset, the drift, and/or the number of ticks of the clock of 32768 Hz frequency since the sync-time of the second communication device in the timing information. Accordingly, the first communication device may determine the sync-time of the second communication device.

In accordance with some embodiments, at step 408, the first communication device may map the sync-time of the second communication device to a second local time of the clock of the first communication device based on the first local time, and the sync-time of the second communication device as determined at step 406. The first communication device may calculate the second local time based on the clock of the first communication device by subtracting a known delay associated with the second communication device. The known delay may include a delay at the second communication device to transmit the at least one message since the sync-time of the second communication device and other communication delays, such as path delay, processing delay, etc.

In accordance with some embodiments, at step 410, the first communication device may update its sync-time based on the second local time. Accordingly, the first communication device may synchronize its sync-time with respect to the sync-time of the second communication device.

In the communication system where the first communication device may also receive at least one message from another communication device, for example, a third communication device, the first communication device may synchronize its sync-time using one or more algorithms described in this disclosure.

In some embodiments, the first communication device may store in the memory 304 historical data while various steps in accordance with various embodiments as described herein during the sync-time adjustment process.

In some embodiments, the communication device may be a portable tag or a user equipment (UE) such as a smartphone, a mobile phone, a tablet, etc.

Finally, various embodiments described in this disclosure may bring long-term stability in a complex real-time network. Various embodiments described in this disclosure may also help the communication devices to save their battery power.

What is claimed is:

1. A communication device of a plurality of communication devices, the communication device comprising:
   a clock;
   a first transceiver coupled with an antenna;
   a second transceiver coupled with a transducer;
   a memory; and
   at least one processor configured to execute instructions stored in the memory that cause the at least one processor to perform operations comprising:
      receiving at least one message from a second communication device of the plurality of communication devices over a preconfigured time duration;
      determining a first local time of the clock of the communication device at which the at least one message from the second communication device is received;
      determining a sync-time of the second communication device based on the at least one message from the second communication device;
      mapping the sync-time of the second communication device to a second local time of the clock of the communication device based on the first local time, and the determined sync-time of the second communication device; and
      adjusting a sync-time of the communication device based on the second local time,
   wherein the sync-time of the communication device corresponds with a first configurable offset from a reference time, within which a first data is transmitted from the communication device to the plurality of communication devices, and
   wherein the sync-time of the second communication device corresponds with a second configurable offset from the reference time, within which a second data is transmitted from the second communication device to the plurality of communication devices.

2. The communication device of claim 1, wherein the at least one message from the second communication device comprises first timing information that comprises at least one of a number of ticks since the sync-time of the second communication device, a timestamp of transmission of the at least one message from the second communication device, and an offset since the sync-time of the second communication device.

3. The communication device of claim 2, wherein the at least one message from the second communication device further comprises an identifier of the second communication device.

4. The communication device of claim 1, wherein the preconfigured time duration is not more than 60 seconds.

5. The communication device of claim 1, wherein the operations further comprise:
   receiving at least one message from a third communication device of the plurality communication devices over the preconfigured time duration, wherein the at least one message from the third communication device comprises second timing information that indicates a sync-time of the third communication device, and an identifier of the third communication device;
   determining a third local time of the clock of the communication device at which the at least one message from the third communication device is received;
   determining the sync-time of the third communication device based on the second timing information;
   mapping the sync-time of the third communication device to a fourth local time of the clock of the communication device based on the third local time, and the determined sync-time of the third communication device; and
   adjusting the sync-time of the communication device based on an average of the second local time and the fourth local time.

6. The communication device of claim 1, wherein the operations further comprise:
   receiving at least one message from a third communication device of the plurality of communication devices over the preconfigured time duration, wherein the at least one message from the third communication device comprises second timing information that indicates a sync-time of the third communication device, and an identifier of the third communication device;
   determining a third local time of the clock of the communication device at which the at least one message from the third communication device is received;

determining the sync-time of the third communication device based on the second timing information;

mapping the sync-time of the third communication device to a fourth local time of the clock of the communication device based on the third local time, and the determined sync-time of the third communication device; and adjusting the sync-time of the communication device based on a smaller of the second local time and the fourth local time.

7. The communication device of claim 1, wherein the clock has a frequency of 32768 hertz (Hz).

8. The communication device of claim 1, wherein the operations further comprise:

receiving one or more identifiers of the plurality of communication devices to which the communication device is either authorized or not authorized to adjust the sync-time of the communication device.

9. The communication device of claim 1, wherein the first data comprises location information of the communication device or the second data comprises location information of the second communication device, and wherein the communication device and the second communication device are base stations.

10. The communication device of claim 1, wherein the first data or the second data is transmitted or received by the communication device or the second communication device as an acoustic signal for location positioning.

11. The communication device of claim 1, wherein the operations further comprise:

transmitting at least one message from the communication device to the plurality of communication devices upon adjusting the sync-time of the communication device with respect to the second communication device and/or a third communication device, wherein the at least one message from the communication device comprises timing information that corresponds with the sync-time of the communication device, and an identifier of the communication device.

12. The communication device of claim 1, wherein the first transceiver is a radio frequency transceiver, and the second transceiver is either an infrared transceiver or an acoustic transceiver, and wherein at least one message from the communication device is transmitted using the first transceiver or the second transceiver, or the at least one message from the second communication device is received using the first transceiver or the second transceiver.

13. The communication device of claim 1, wherein the communication device or the second communication device is a portable tag or user equipment (UE) device.

14. The communication device of claim 1, wherein the first data is transmitted using the first transceiver or the second transceiver.

15. A method, comprising:

receiving, at a first communication device of a plurality of communication devices, at least one message from a second communication device of the plurality of communication devices over a preconfigured time duration;

determining, at the first communication device, a first local time of a clock of the first communication device at which the at least one message from the second communication device is received;

determining, at the first communication device, a sync-time of the second communication device based on the at least one message from the second communication device;

mapping, at the first communication device, the sync-time of the second communication device to a second local time of the clock of the first communication device based on the first local time, and the determined sync-time of the second communication device;

adjusting, at the first communication device, a sync-time of the first communication device based on the second local time; and transmitting a first data or a second data as an acoustic signal for location positioning, wherein the sync-time of the first communication device corresponds with a first configurable offset from a reference time, within which the first data is transmitted from the first communication device to the plurality of communication devices, and wherein the sync-time of the second communication device corresponds with a second configurable offset from the reference time, within which the second data is transmitted from the second communication device to the plurality of communication devices.

16. The method of claim 15, wherein the at least one message from the second communication device comprises first timing information and an identifier of the second communication device, and wherein the first timing information comprises at least one of a number of ticks since the sync-time of the second communication device, a timestamp of transmission of the at least one message from the second communication device, and an offset since the sync-time of the second communication device.

17. The method of claim 15, wherein the preconfigured time duration is not more than 60 seconds or the preconfigured time duration varies over a run time of the first communication device.

18. The method of claim 15, wherein receiving the at least one message from the second communication device comprises:

receiving the at least one message from the second communication device using a radio frequency transceiver, an acoustic transceiver, or an infrared transceiver.

19. The method of claim 15, further comprising:

transmitting the first data or the second data as an acoustic signal for location positioning.

20. Non-transitory computer-readable media (CRM) comprising computer instructions, where upon execution of the computer instructions by one or more processors of a communication device of a plurality of communication devices, cause the one or more processors to:

receive at least one message from a second communication device of the plurality of communication devices over a preconfigured time duration;

determine a first local time of a clock of communication device at which the at least one message from the second communication device is received;

determine a sync-time of the second communication device based on the at least one message from the second communication device;

map the sync-time of the second communication device to a second local time of the clock of the communication device based on the first local time, and the determined sync-time of the second communication device;

adjust a sync-time of the communication device based on the second local time; and transmit a first data or a second data as an acoustic signal for location positioning, wherein the sync-time of the communication device corresponds with a first configurable offset from a reference time, within which the first data that comprises location information of the communication device is transmitted from the communication device to the plurality of communication devices, wherein the sync-time of the second communication device corresponds with a second configurable offset from the reference time, within which the second data that comprises location information of the second communication device is transmitted from the second communication device to the plurality of communication devices, and wherein the communication device and the second communication device are base stations.

* * * * *